(12) United States Patent
Tachi

(10) Patent No.: US 10,379,799 B2
(45) Date of Patent: Aug. 13, 2019

(54) IMAGE FORMING APPARATUS, CONTROL METHOD, AND STORAGE MEDIUM

(71) Applicant: CANON KABUSHIKI KAISHA, Tokyo (JP)

(72) Inventor: Daiki Tachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/136,850

(22) Filed: Sep. 20, 2018

(65) Prior Publication Data

US 2019/0102127 A1 Apr. 4, 2019

(30) Foreign Application Priority Data

Oct. 2, 2017 (JP) .................. 2017-192998

(51) Int. Cl.
*G06F 3/12* (2006.01)
*G05B 19/418* (2006.01)

(52) U.S. Cl.
CPC ..... *G06F 3/1267* (2013.01); *G05B 19/41875* (2013.01); *G06F 3/1204* (2013.01); *G06F 3/1259* (2013.01); *G06F 3/1274* (2013.01); *G06F 3/1208* (2013.01); *G06F 3/1288* (2013.01)

(58) Field of Classification Search
CPC .... G06F 3/1208; G06F 3/1288; G06F 3/1267; G06F 3/1204; G06F 3/1259; G06F 3/1274; G05B 19/41875
USPC ........................................ 358/1.15
See application file for complete search history.

(56) References Cited

U.S. PATENT DOCUMENTS

| | | | | |
|---|---|---|---|---|
| 2005/0262394 A1* | 11/2005 | Yasukawa | ........... | G06F 11/0733 714/23 |
| 2006/0283933 A1* | 12/2006 | Ueda | .................... | H04N 1/2346 235/375 |
| 2010/0067935 A1* | 3/2010 | Nakamura | ........... | G03G 15/553 399/71 |
| 2014/0320890 A1* | 10/2014 | Kamasuka | ......... | H04N 1/00824 358/1.15 |

FOREIGN PATENT DOCUMENTS

JP 2010-74377 A 4/2010

* cited by examiner

*Primary Examiner* — Allen H Nguyen
(74) *Attorney, Agent, or Firm* — Canon U.S.A., Inc. IP Division

(57) ABSTRACT

Component information about a component of an image forming apparatus is acquired before the component is replaced, and the component information is held by a storage unit. This enables necessary component information to be output even in the case where the component has been replaced.

9 Claims, 9 Drawing Sheets

IMAGE FORMING APPARATUS, CONTROL METHOD, AND STORAGE MEDIUM

BACKGROUND

Field of the Disclosure

The present disclosure relates to an image forming apparatus that prints component information.

Description of the Related Art

Some typical image forming apparatuses are known to include a function of collecting information indicating a use state of a component included in the image forming apparatus (hereinafter, referred to as "component information") and printing the component information. Furthermore, Japanese Patent Application Laid-Open No. 2010-74377 discusses a technique for transmitting the component information to a server through a network.

Some sales companies of the image forming apparatus provide the service of, for example, replacing a component without charge in a case where the sold image forming apparatus fails and a use situation of the image forming apparatus is within a guaranteed range. In such a service, the sales company uses the component information, in some cases, to check whether the image forming apparatus is within the guaranteed range on the basis of the use situation of the image forming apparatus.

When the image forming apparatus fails, printing of the component information may be inexecutable. Additionally, if the printing is executed after the component is replaced to resolve the failed state, the component information is updated. In these cases, it is not possible to acquire the component information before the failure.

Moreover, the target image forming apparatus is not necessarily used while connected to the network. Thus, the method discussed in Japanese Patent Application Laid-Open No. 2010-74377 is not generally usable in providing the above-described component replacement service.

SUMMARY

According to an aspect of some embodiments, an image forming apparatus includes a printer, a storage device, a memory configured to store instructions, and a processor configured to execute the instructions causing the image forming apparatus to receive a print instruction to print component information indicating a use state of a component of the image forming apparatus, determine whether print processing according to the print instruction is executable with the printer, perform control to cause the printer to print the component information according to the print instruction in a case where it is determined that the print processing is executable, and perform control to cause the storage device to hold the component information without performing printing in a case where it is determined that the print processing is inexecutable.

Further features of the present embodiments will become apparent from the following description of exemplary embodiments with reference to the attached drawings.

DESCRIPTION OF THE EMBODIMENTS

Some exemplary embodiments are described below with reference to the accompanying drawings. The following description of exemplary embodiments is not intended to limit the claims, and all of the combinations of features described in the exemplary embodiments are not necessarily essential for all embodiments.

Figure 1:
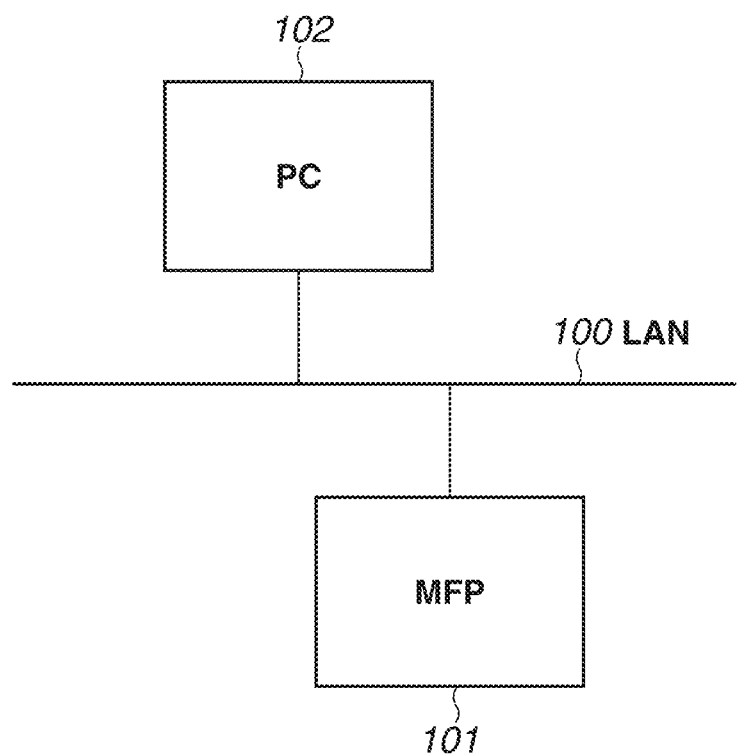
FIG. 1 is an overall view of an image processing system according to a first exemplary embodiment.

A first exemplary embodiment will be described below in detail. A configuration of an image processing system according to the present exemplary embodiment is described with reference to FIG. 1. A multifunction peripheral (MFP) 101 and a personal computer (PC) 102 are communicably connected to each other on a local area network (LAN) 100. The MFP 101 is an example of an image forming apparatus. As the image forming apparatus, a single function printer (SFP) may be used.

The MFP 101 can transmit an image data file to a folder inside the PC 102 as a destination, for example through server message block (SMB) or file transfer protocol (FTP). Furthermore, the MFP 101 can transmit image data to the PC 102 by an electronic mail through a mail server (not illustrated).

Figure 2:
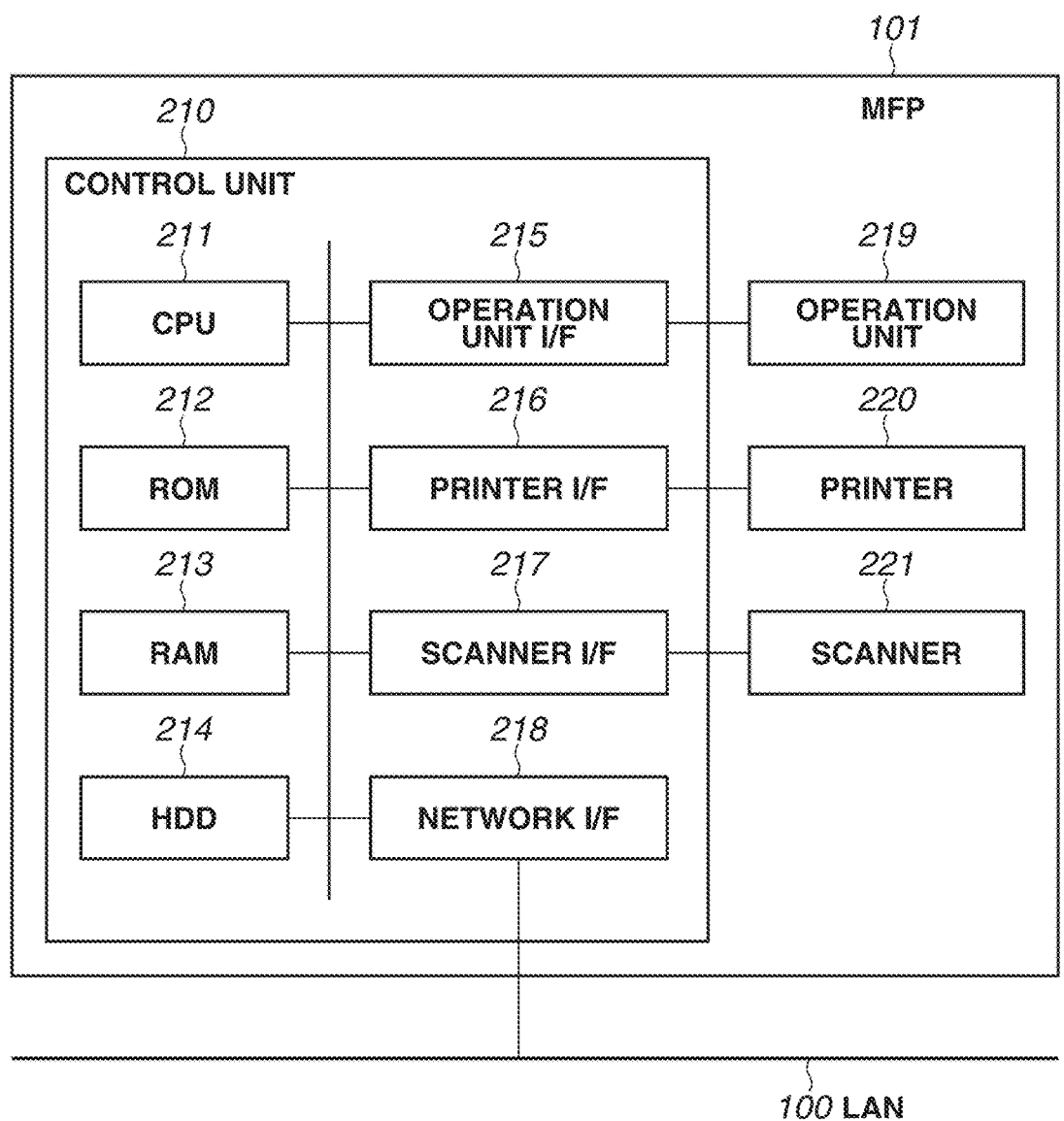
FIG. 2 is a block diagram illustrating a configuration of a multifunction peripheral (MFP) according to the first exemplary embodiment.

FIG. 2 is a block diagram illustrating a configuration of the MFP 101. A control unit 210 including a central processing unit (CPU) 211 controls the entire operation of the MFP 101. The CPU 211 reads out a control program held by a read-only memory (ROM) 212 and performs various control, such as read control and transmission control. A random access memory (RAM) 213 is used as a temporary storage region, such as a main memory and a work area of the CPU 211. In the case of this embodiment of the MFP 101, a single CPU 211 uses a single memory (RAM 213 or hard disk drive (HDD) 214) to execute processing illustrated in flowcharts of FIGS. 5, 6, and 8 described below; however, the configuration is not limited thereto. For example, a plurality of CPUs and a plurality of RAMs or HDDs may cooperate to perform the processing illustrated in the flowcharts of FIGS. 5, 6, and 8. The HDD 214 is a nonvolatile storage unit holding image data and various kinds of programs.

An operation unit interface (I/F) 215 connects an operation unit 219 and the control unit 210. According to the present exemplary embodiment, the operation unit 219 is provided with, for example, a display unit including a touch panel function and a keyboard. The display unit of the operation unit 219 displays an operation screen, which will be described below with reference to FIG. 4. The operation unit 219 receives an instruction to print component information through the operation screen. The component information indicates a use state of a component. Examples of the component information include identification information about an apparatus body (MFP 101), identification information about a component, lifetime information about (life value of) the component, a date and time when the component is attached, and a date when the component is detached.

Moreover, the operation unit 219 receives, through the operation screen, a designation of the component, the component information about which is to be printed (designation receiving step). The print instruction and the designation of the component may not be necessarily performed through the operation screen, and may be input through, for example, a hardware key included in the operation unit 219.

A printer I/F 216 connects a printer 220 and the control unit 210. The image data to be printed with the printer 220 is transferred from the control unit 210 via the printer I/F 216, and is printed on a recording medium by the printer 220. The printer 220 executes print processing.

A scanner I/F 217 connects a scanner 221 and the control unit 210. The scanner 221 reads an image of a document, generates image data (e.g., an image file), and provides the image data to the control unit 210 through the scanner I/F 217. The MFP 101 can transmit the image data (image file) generated by the scanner 221, for example through file transfer or e-mail.

A network I/F 218 connects the control unit 210 (MFP 101) to the LAN 100. The network I/F 218 transmits image data and information to an external apparatus (e.g., PC 102) on the LAN 100, or receives various types of information from an external apparatus on the LAN 100.

Figure 3:
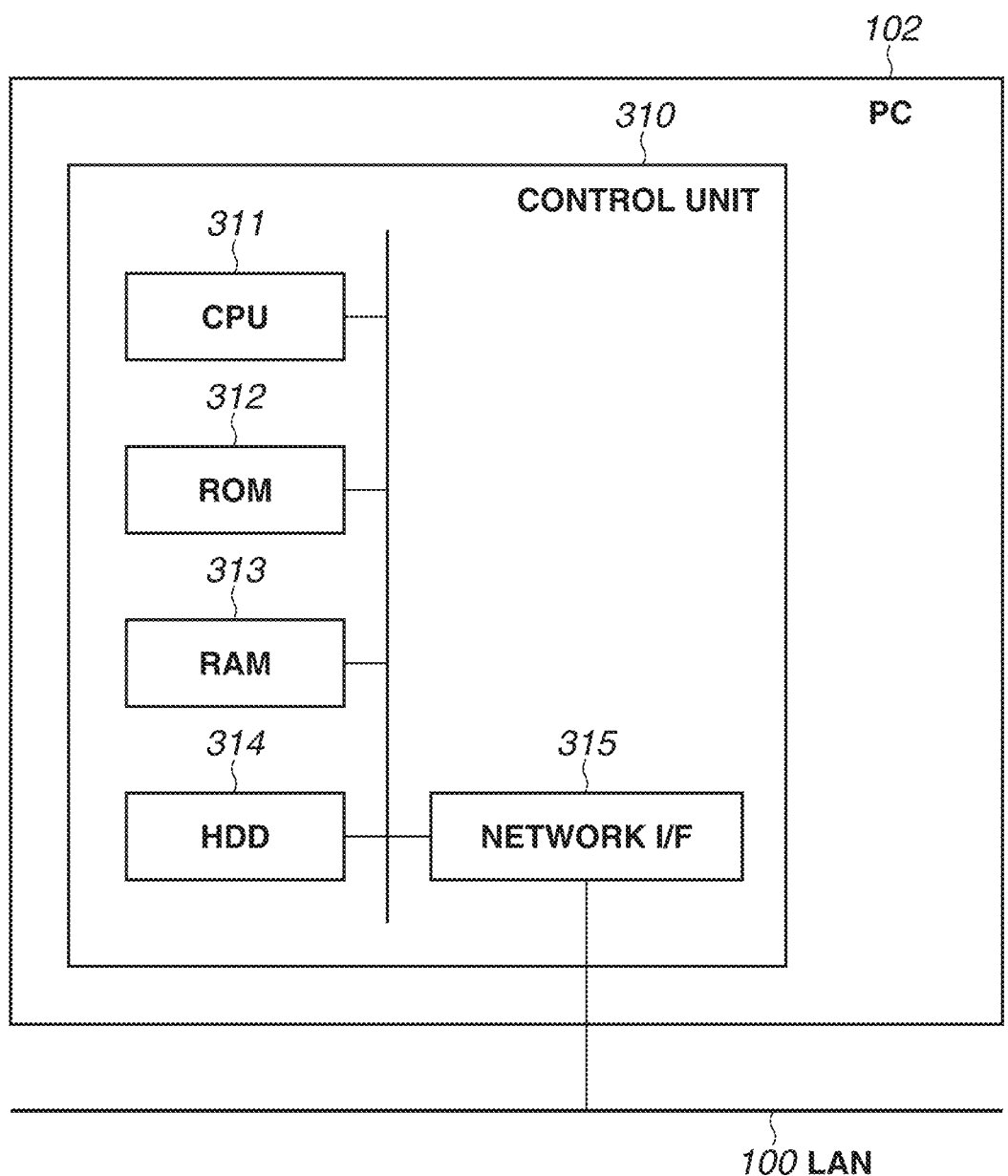
FIG. 3 is a block diagram illustrating a configuration of a personal computer (PC) according to the first exemplary embodiment.

FIG. 3 is a block diagram illustrating a configuration of the PC 102. A control unit 310 including a CPU 311 controls the entire operation of the PC 102. The CPU 311 reads out control programs held by a ROM 312 and executes various control processing. A RAM 313 is used as a temporary storage region, such as a main memory and a work area of the CPU 311. An HDD 314 holds image data and various programs.

A network I/F 315 connects the control unit 310 to the LAN 100. The network I/F 315 transmits and/or receives various types of information to and/or from another apparatus on the LAN 100.

Figure 4:
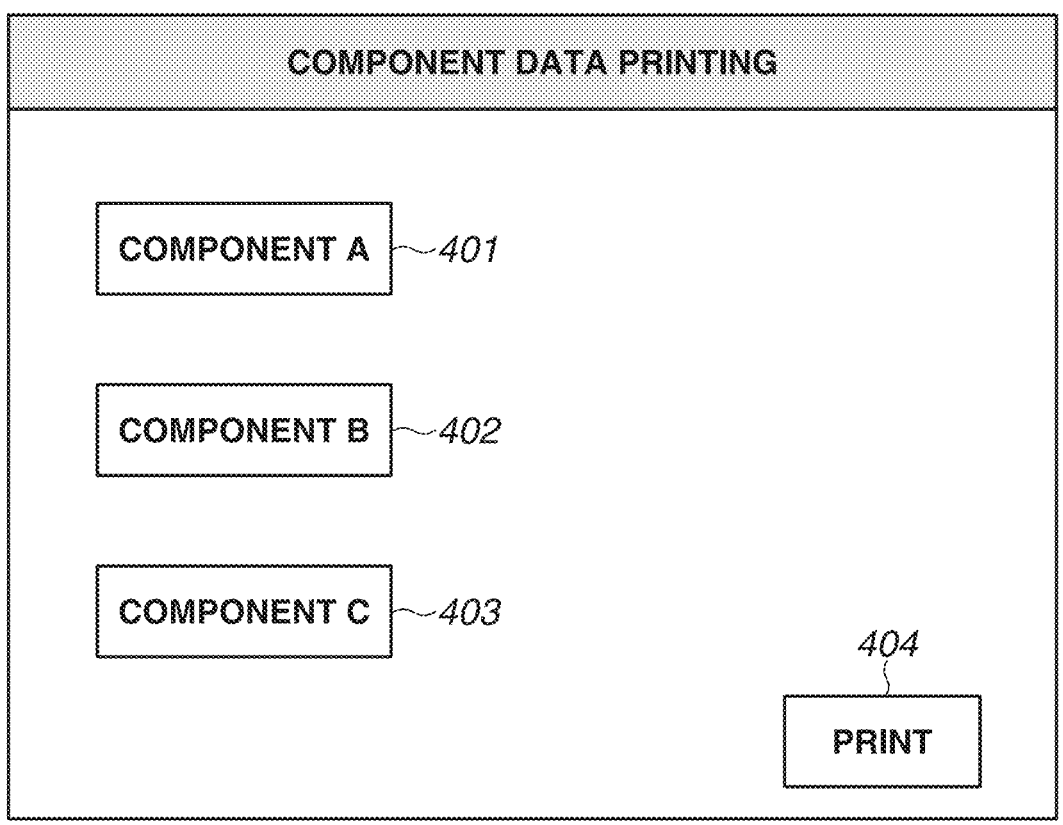
FIG. 4 is a diagram illustrating an operation screen of the MFP according to the first exemplary embodiment.

FIG. 4 is a diagram s rating an example of the operation screen displayed on the operation unit 219. The operation screen is displayed on the display unit of the operation unit 219 under display control of the CPU 211. The operation screen illustrated in FIG. 4 is displayed when an instruction to print data indicating, for example, a consumption degree of a component of the MFP 101 is issued. For example, when a defect occurs in the MFP 101 and a service person determines that it is necessary to replace a component of the MFP 101, the service person uses this operation screen to instruct output of component information about the component to be replaced. The operation screen may be displayed in a service mode that allows the service person to perform, on the MFP 101, operation for maintenance of the MFP 101. The service person performs a predetermined operation on the MFP 101 or inputs predetermined authentication information to the MFP 101, thereby causing the MFP 101 to operate in the service mode.

Operation keys 401 to 403 are operation keys (graphical user interface) for designating the component, about which the component information is to be printed, out of the components included in the MFP 101. The service person selects the component to be replaced. Depression (or touch) of any of the operation keys 401 to 403 causes the MFP 101 to receive designation of the component, about which the component information is to be printed.

An operation key 404 is an operation key (graphical user interface) for instructing the printing of the component information about the component corresponding to the operation key selected from among the operation keys 401 to 403. Depression (or touch) of the operation key 404 causes the MFP 101 to receive the instruction to print the component information indicating a use state of the component. As described above, the component information indicates the use state of the component. Examples of the component information include the identification information about the apparatus body (MFP 101), the identification information about the component, the lifetime information about (life value of) the component, the date and time when the component was attached, and the date and time when the component was detached. The component information is used to check whether the component is in a use state in which product guarantee is available (within guaranteed range). For example, in a case where a counter value which indicates the number of times a printing drum or a fixing unit (not illustrated), being a component of the printer 220, has been used is lower than a guaranteed counter value, the component information is used for replacement of the component without charge. The printed component information is handled as a certificate for entitling a user of the MFP 101 to receive the guarantee. The printing of the component information is started upon selection of the operation key 404.

Figure 5:
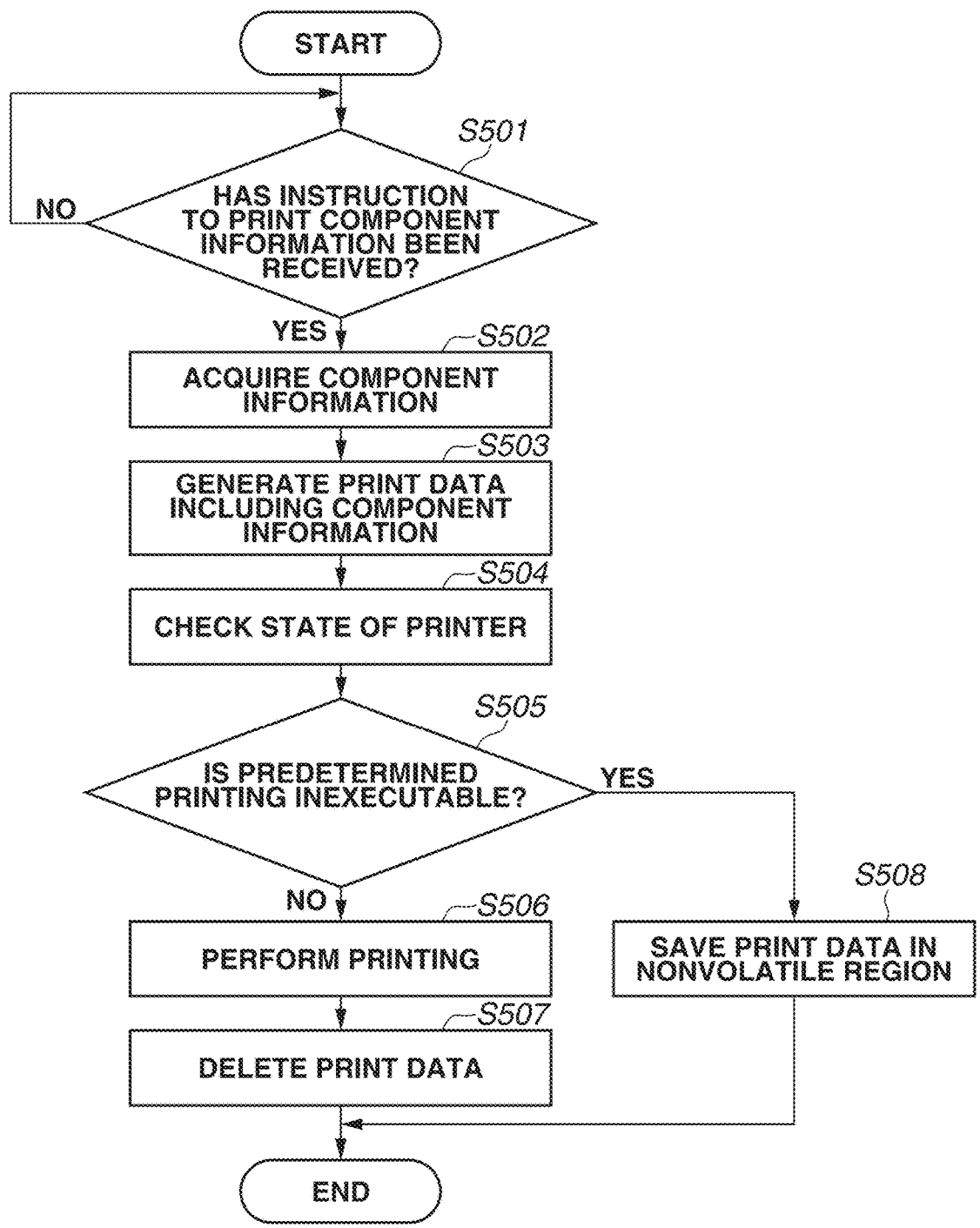
FIG. 5 is a flowchart illustrating processing of saving print data about component information according to the first exemplary embodiment.

FIG. 5 is a flowchart to explain processing of printing the component information. Each operation illustrated in the flowchart of FIG. 5 can be realized by the CPU 211 of the MFP 101 executing a control program held by the HDD 214. The print processing illustrated in FIG. 5 is started with the operation screen illustrated in FIG. 4 being displayed. As described above, according to the present exemplary embodiment, the operation screen illustrated in FIG. 4 is displayed by the service person performing the predetermined operation on the MFP 101.

In step S501, the CPU 211 waits for an instruction to print the component information to be received from the user. When the CPU 211 receives the instruction (YES in step S501), the processing proceeds to step S502.

In step S502, the component information corresponding to the component selected in the selection screen of FIG. 4 is acquired from the HDD 214, and is stored in the RAM 213. In other words, the CPU 211 collects the component information indicating the use state of the designated component in response to designation of the component. For example, the CPU 211 extracts and collects an operation log associated with the identification information about the component corresponding to the designation from among operation log information held by the HDD 214. The processing proceeds to step S503 after the collection of the component information is completed.

In step S503, print data including the component information acquired in step S502 is generated. The processing proceeds to step S504 after generation of the print data is completed.

In step S504, an operating state of the printer 220 of the MFP 101 is checked. The processing then proceeds to step S505.

In step S505, it is determined whether the operating state of the printer 220 checked in step S504 is in a state where a predetermined printing is inexecutable (e.g., under fault conditions). When the printer 220 is not under fault conditions (NO in step S505), the processing proceeds to step S506. When the printer 220 is under fault conditions (YES in step S505), the processing proceeds to step S508.

According to the present exemplary embodiment, the fault conditions indicate, for example, a state where the component information cannot be printed due to failure of hardware, defect of software, etc. In step S505, for example, in a case where an error corresponding to a predetermined error code occurs, it is determined that the printer 220 is under the fault conditions. The CPU 211 determines whether the print processing according to the print instruction is executable through the processing in step S505.

In step S506, since the printer 220 is operating normally, the print data is input to the printer 220 through the printer I/F 216, and printing is executed. After completion of the print processing, the processing proceeds to step S507. As described above, in the case where the CPU 211 determines that the print processing is executable, the CPU 211 performs print control so as to cause the printer 220 to print the component information according to the print instruction.

In step S507, the printed print data is deleted from the RAM 213. The processing in the flowchart then ends. In a case of a configuration in which the print data generated in step S503 is also held by the HDD 214, the print data is also deleted from the HDD 214 in step S507.

In step S508, the print processing is not executable because the printer 220 fails or is otherwise not operating normally. Accordingly, the print data generated in step S503 is saved in a nonvolatile region of the HDD 214, etc., and the processing in the flowchart then ends. At this time, a flag indicating that the print data has been saved in the nonvolatile region may be set (turned on or enabled). The nonvolatile region is not limited to the HDD, and may be a storage region of a recording medium, such as a solid state drive (SSD). As described above, in the case where the CPU 211 determines that the print operation is not executable, the CPU 211 performs control so as to store the component information in the nonvolatile storage unit.

The example has been described in which the determination in step S505 is performed before execution of the printing in step S506; however, the processing is not limited thereto. It may be determined whether the print processing is able to be completed after the print processing is started. In addition, in a case where it is determined that the print processing is not able to be completed, the processing of saving the print data in the nonvolatile region may be executed.

Such a modification will be described with reference to FIG. 9. Each operation illustrated in the flowchart of FIG. 9 can be executed by the CPU 211 of the MFP 101 executing the control programs held by the HDD 214.

The processing in steps S501 to S504 are similar to the processing described with reference to FIG. 5, and thus, a description thereof is omitted.

After the processing in step S504 is completed, the CPU 211 inputs the print data to the printer 220 in step S901.

Next, in step S902, the CPU 211 determines whether the printer 220 is in a state where a predetermined printing is inexecutable (not able to be executed) for the input print data. The determination in step S902 is made on the basis of a check result in step S504. The determination is made in a similar manner to the determination in step S505. The CPU 211 determines whether the print processing according to the print instruction is inexecutable through the processing in step S902. In the case where the check result in step S504 indicates that the printer 220 is not in the state in which the predetermined printing is inexecutable (NO in step S902), the processing proceeds to step S903, and the CPU 211 performs the print processing.

After the print processing is completed, the CPU 211 deletes the print data from the RAM 213 in step S904. In the case of the configuration in which the print data generated in step S503 is also held by the HDD 214 as with the description of FIG. 5, the print data is deleted also from the HDD 214 in step S904.

In a case where it is determined that the printer 220 is the state where the predetermined printing is inexecutable in step S902 (Yes in step S902), the processing proceeds to step S905. In step S905, the CPU 211 saves the print data in the nonvolatile region of the HDD 214. The processing then ends. At this time, a flag indicating that the print data has been saved in the nonvolatile region may be set. Further, the nonvolatile region is not limited to the HDD, and may be a storage region of a recording medium such as an SSD, as with the example described with reference to FIG. 5. The above is the description of the processing in the modification of FIG. 5.

Figure 9:
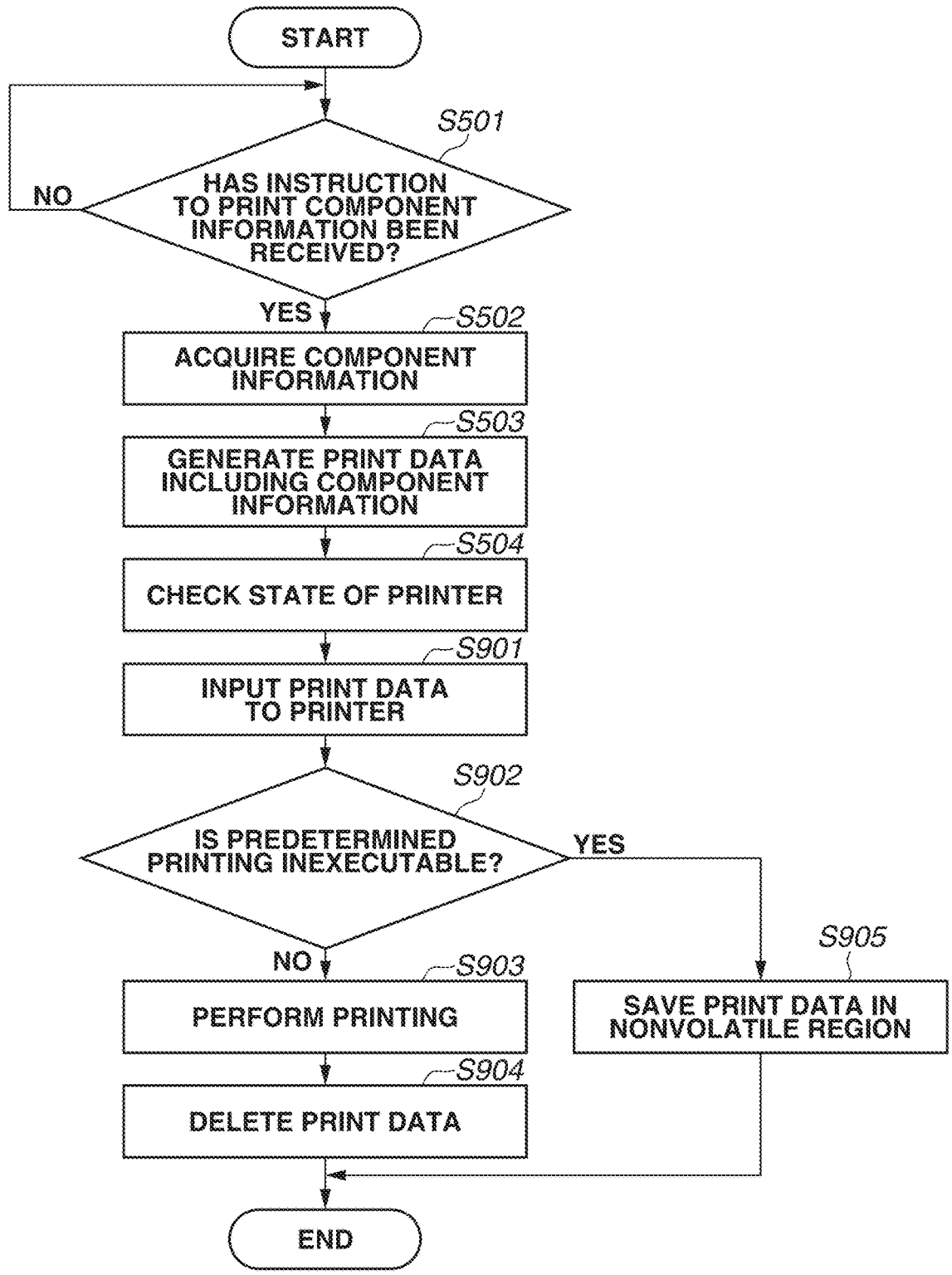
FIG. 9 is a flowchart illustrating a modification of the processing of saving the print data about the component information according to the first exemplary embodiment.

According to the processing in FIG. 5 or the processing in FIG. 9, in the case where the printing of the print data about the component information is inexecutable, the print data may be stored in and held by the nonvolatile storage medium. In contrast, in the case where the printing of the print data succeeds, the print data is deletable.

Subsequently, a procedure of printing the print data saved in step S508 of FIG. 5 or in step S905 of FIG. 9 will be described with reference to a flowchart of FIG. 6. Each operation illustrated in the flowchart of FIG. 6 is realized by the CPU 211 of the MFP 101 executing the control programs held by the HDD 214.

Figure 6:
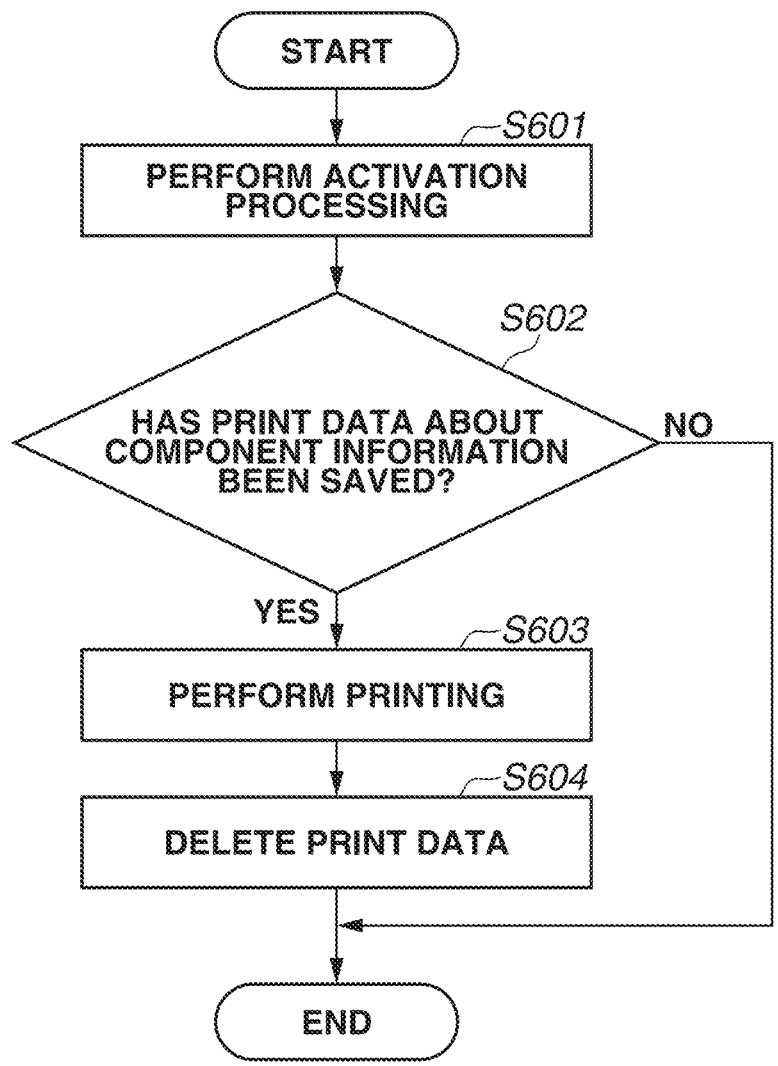
FIG. 6 is a flowchart illustrating processing of printing the print data about the component information according to the first exemplary embodiment.

The processing illustrated in FIG. 6 is started by the MFP 101 being activated after the failed component of the printer 220 is replaced and the failure is resolved.

In step S601, the MFP 101 is activated. After the activation is completed, the processing proceeds to step S602.

In step S602, it is checked whether the print data about the component information has been saved in the predetermined storage region of the HDD 214 of the MFP 101. In a case where the print data has been saved (YES in step S602), the processing proceeds to step S603. In a case where the print data has not been saved (NO in step S602), the processing in the flowchart ends. The determination in step S602 may be made on the basis of a flag. For example, in a case where the flag indicating that the print data has been saved in the nonvolatile region is enabled, the CPU 211 may determine that the print data about the component information has been saved in the predetermined storage region.

In step S603, the print data saved in the HDD 214 is input to the printer 220 through the printer I/F 216, and printing is executed. After the printing is completed, the processing proceeds to step S604.

In step S604, the print data that has been printed in step S603 is deleted from the HDD 214. After the deletion is completed, the processing in the flowchart ends.

According to the above-described exemplary embodiments, even in the case where the component information is not printed out due to failure of the component, it is possible to print the component information after the component is replaced.

This makes it possible to surely print the component information used to check whether the use situation of the MFP 101 is within the guaranteed range in the case where the failure, etc., occurs.

A second exemplary embodiment will be described below. According to the present exemplary embodiment, an example is provided in which the component information is transmitted to a previously-registered mail address in the case where the printing is inexecutable due to the printer failure. Detailed description of configurations similar to the configurations of the above-described first embodiment is omitted.

Figure 7:
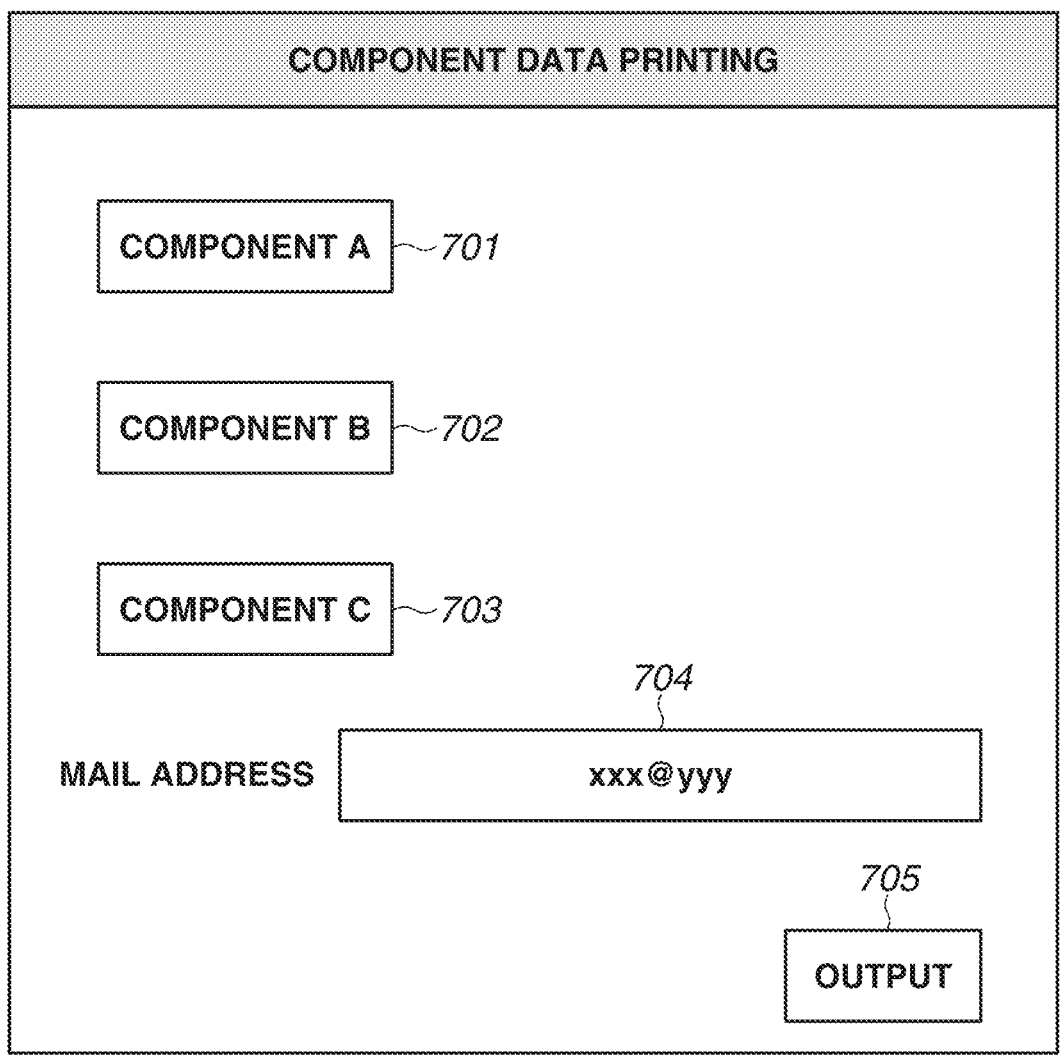
FIG. 7 is a diagram illustrating an operation screen of an MFP according to a second exemplary embodiment.

FIG. 7 is a diagram illustrating an example of an operation screen displayed on the operation unit 219 according to the present exemplary embodiment. The operation screen illustrated in FIG. 7 is displayed in issuance of an instruction for printing data including, for example, a consumption degree of the component of the MFP 101.

Operation keys 701 to 703 are used for designating the component, about which the component information is to be printed. Furthermore, an operation key 705 is used for instructing output of the component information about the designated component. The processing of outputting the component information is stated in response to the output instruction through the operation key 705. According to the present exemplary embodiment, in a case where it is determined that the printer 220 is in a state where printing is inexecutable and the component information is transmittable to a predetermined storage device through the network, the component information is transmitted to the predetermined storage device in response to the operation performed on the operation key 705. In a case where the component information is not transmittable, the component information is stored in the predetermined nonvolatile region in a manner similar to the first exemplary embodiment.

An operation key 704 is used for inputting a mail address. The network I/F 218 of the MFP 101 transmits the component information to the mail address input with the operation key 704 when the printer 220 is under fault conditions. The mail address is used to transmit data to the storage device that is connected to the MFP 101 through the network and can hold the component information about the MFP 101. Examples of the storage device include an information processing apparatus, such as a PC.

Figure 8:
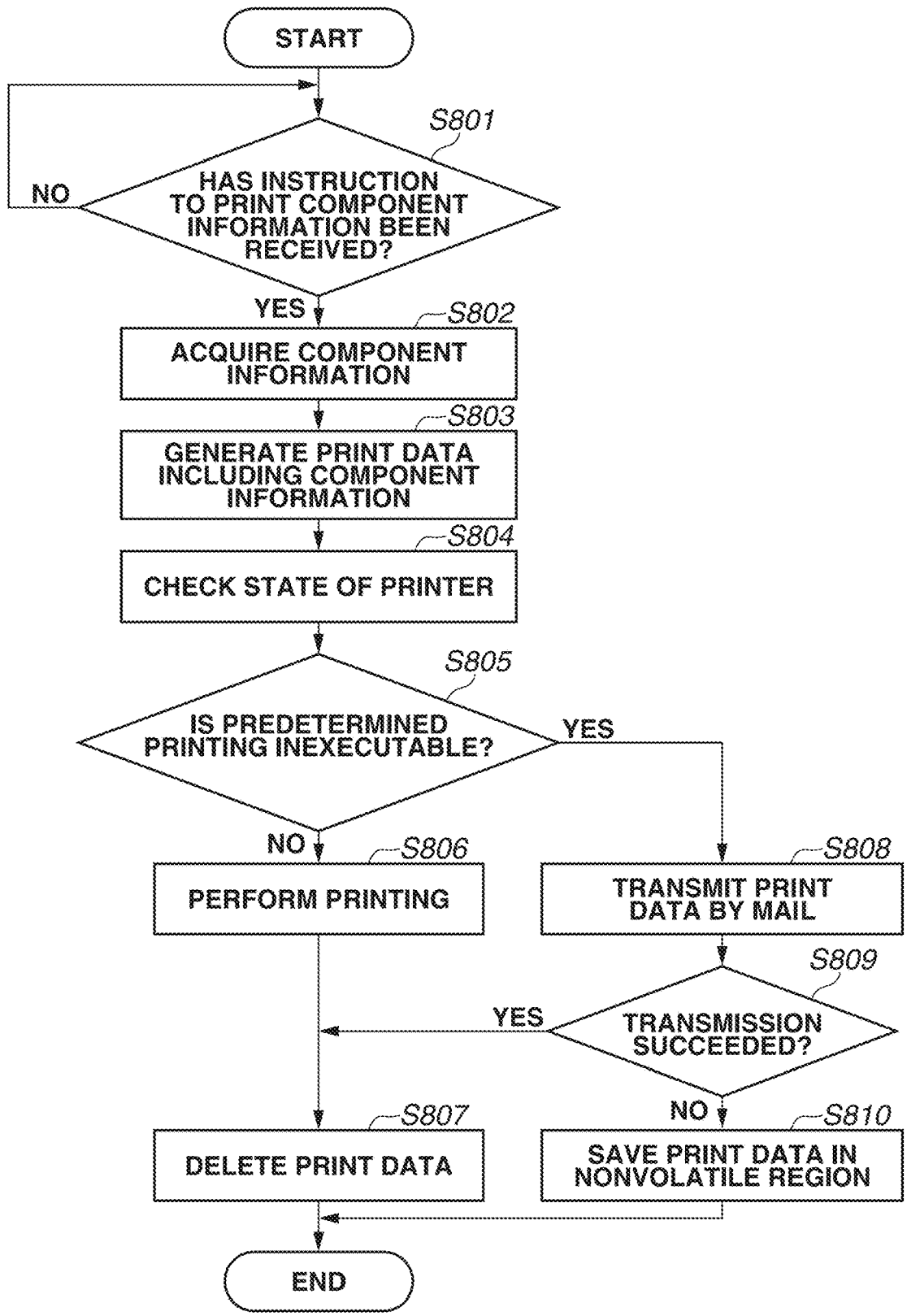
FIG. 8 is a flowchart illustrating processing of saving print data about component information according to the second exemplary embodiment.

FIG. 8 is a flowchart to elaborate operation to execute the outputting of the component information. Each operation illustrated in the flowchart of FIG. 8 is realized by the CPU 211 of the MFP 101 executing a control program held by the HDD 214.

Steps S801 to S807 are similar to steps S501 to S507 described with reference to FIG. 5, and description thereof is thus omitted.

In a case where it is determined that the printer 220 is in a state where printing of the component information is inexecutable (YES in step S805), the processing proceeds to step S808. In step S808, the processing of transmitting the component information is performed. The CPU 211 controls the network I/F 218 so as to transmit the component information generated in step S802 to the mail address input with the operation key 704. In the following description, an example is provided in which the component information is included in a main text of the electronic mail; however, the transmission is not limited thereto. Electronic data including the component information may be attached to the electronic mail and transmitted. Alternatively, the component information may be transmitted through the FTP or the SMB, in place of the electronic mail.

In step S809, the CPU 211 checks whether transmission of the electronic mail transmitted in step S808 has succeeded. In a case where the transmission has succeeded (YES in step S809), the processing proceeds to step S807. In a case where the transmission has not succeeded (NO in step S809), the processing proceeds to step S810. In addition, also in a case where a function of transmitting the component information to the predetermined storage device, for example, the electronic mail is disabled, the processing proceeds to step S810. The CPU 211 determines whether the component information is transmittable to the predetermined storage device through the network in the above-described manner.

In step S810, the print data is saved in the HDD 214. The processing in the flowchart then ends.

As described above, in the case where it is determined that the print processing is inexecutable but the component information is transmittable to the storage device, the CPU 211 performs transmission control to transmit the component information to the storage device. In addition, in the case where it is determined that the print processing is inexecutable and the component information is not transmittable to the predetermined storage device, the CPU 211 performs storage control to store the component information in the predetermined nonvolatile storage unit.

The above-described exemplary embodiment enables the component information at the occurrence of failure, etc., to be stored in an external apparatus in a case where the component information is transmittable to the external apparatus through the network. Thus, even in a case where the component information is not printed out due to the failure of a component, it is possible to print the component information with use of the component information held by the external device, after the component is replaced.

Furthermore, in a case where the communication function through the network is not enabled in the MFP 101, in a case where the MFP 101 does not include this function, or in a case where the communication is not performable due to a failure, the component information may be saved in the nonvolatile region as with the first exemplary embodiment.

Accordingly, it is surely possible to print the component information used to check whether the use situation of the MFP 101 is within the guaranteed range when a failure, etc. occurs.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions pray be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-192998, which was filed on Oct. 2, 2017 and which is hereby incorporated by reference herein in its entirety.

What is claimed is:

1. An image forming apparatus, comprising:
   a printer;
   a storage device;
   a memory storing instructions; and
   a processor executing the instructions causing the image forming apparatus to:
   receive a print instruction to print component information indicating a use state of a component of the image forming apparatus,
   determine whether print processing according to the print instruction is executable with the printer,
   perform control to cause the printer to print the component information according to the print instruction in a case where it is determined that the print processing is executable, and
   perform control to cause the storage device to hold the component information without performing printing in a case where it is determined that the print processing is inexecutable.

2. The image forming apparatus according to claim 1, wherein the instructions further cause the image forming apparatus to:
   receive a designation of a component, and
   collect the component information indicating the use state of a component corresponding to the designation in response to receiving the designation and the print instruction,
   wherein the control to cause the printer to print the collected component information according to the print instruction is performed in a case where it is determined that the print processing is executable, and
   wherein the control to cause the storage device to hold the collected component information is performed in a case where it is determined that the print processing is inexecutable.

3. The image forming apparatus according to claim 2, wherein the instructions further cause the image forming apparatus to display a selection screen for selection of a component from among a plurality of components of the image forming apparatus to receive a designation of a component.

4. The image forming apparatus according to claim 1, wherein the instructions further cause the image forming apparatus to perform control to transmit the component information to a predetermined transmission destination through a network in a case where it is determined that the print processing is inexecutable and the component information is transmittable to the predetermined transmission destination through the network, and
   wherein the control to cause the storage device to hold the component information is performed in a case where it is determined that the print processing is inexecutable and the component information is not transmittable to the predetermined transmission destination through the network.

5. A method for controlling an image forming apparatus that includes a printer and a storage device, the method comprising:
   receiving a print instruction to print component information indicating a use state of a component of the image forming apparatus;
   determining whether print processing according to the print instruction is executable with the printer;
   performing control to cause the printer o print the component information according to the print instruction in a case where it is determined that the print processing is executable; and
   performing control to cause the storage device to hold the component information without performing printing in a case where it is determined that the print processing is inexecutable.

6. The method according to claim 5, further comprising:
   receiving a designation of a component; and
   collecting the component information indicating the use state of a component corresponding to the designation in response to receiving the designation and the print instruction,
   wherein the control to cause the printer to print the collected component information according to the print instruction is performed in a case where it is determined that the print processing is executable, and
   wherein the control to cause the storage device to hold the collected component information is performed in a case where it is determined that the print processing is inexecutable.

7. The method according to claim 6, further comprising displaying a selection screen for selection of a component from among a plurality of components of the image forming apparatus to receive the designation of a component.

8. The method according to claim 5, further comprising performing control to transmit the component information to a predetermined transmission destination through a network in a case where it is determined that the print processing is inexecutable and the component information is transmittable to the predetermined transmission destination through the network,
   wherein the control to cause the storage device to hold the component information is performed in a case where it is determined that the print processing is inexecutable and the component information is not transmittable to the predetermined transmission destination through the network.

9. A non-transitory computer readable storage medium on which is stored a computer program for making a computer execute a control method for an image forming apparatus that includes a printer and a storage device, the control method comprising:
   receiving a print instruction to print component information indicating a use state of a component of the image forming apparatus;

determining whether print processing according to the print instruction is executable with the printer;

performing control to cause the printer to print the component information according to the print instruction in a case where it is determined that the print processing is executable; and performing control to cause the storage device to hold the component information without performing printing in a case where it is determined that the print processing is inexecutable.

* * * * *